July 1, 1941. H. C. JOHNSON 2,247,948
JUICE EXTRACTING DEVICE
Filed June 5, 1939
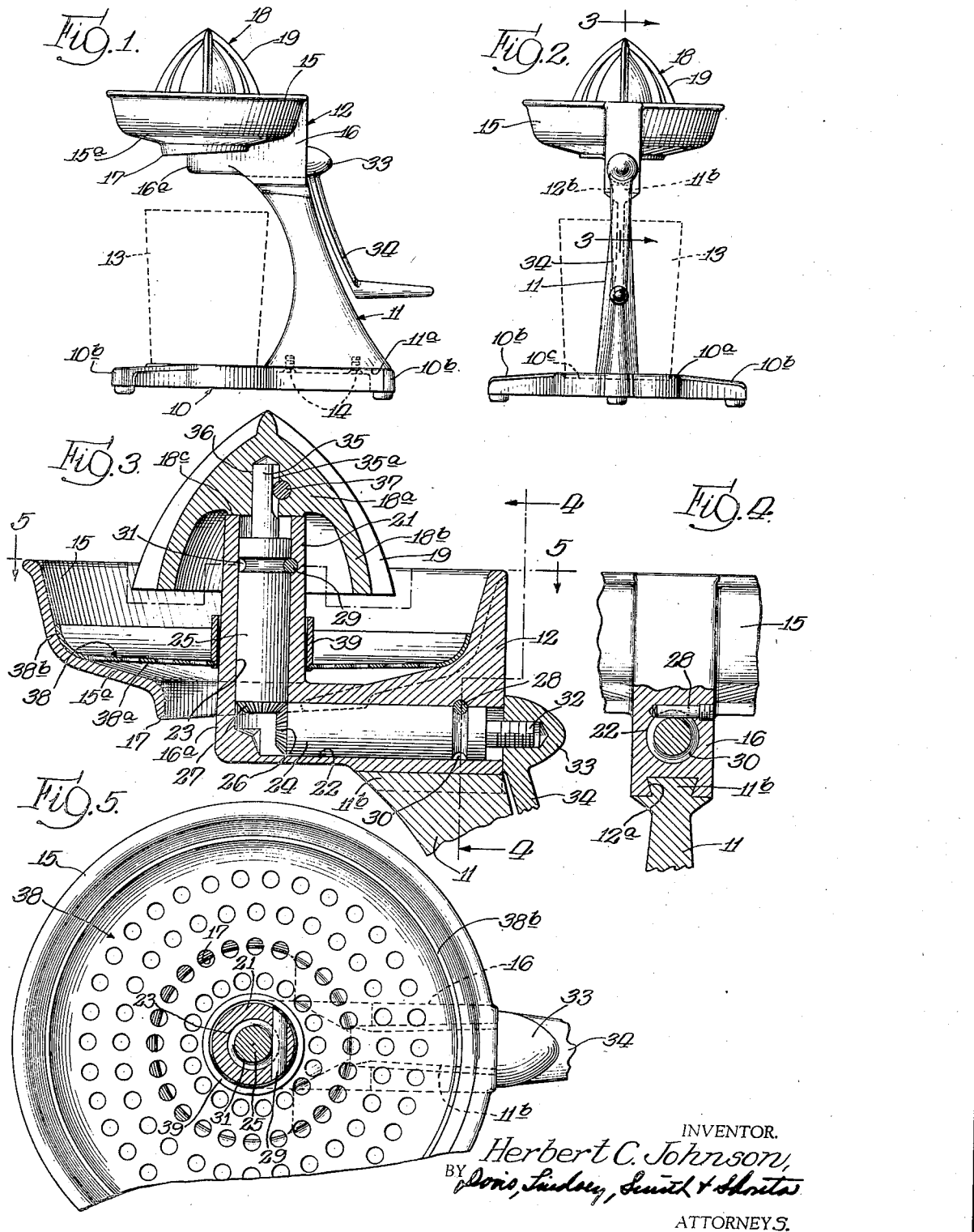
INVENTOR.
Herbert C. Johnson
BY
ATTORNEYS.

Patented July 1, 1941

2,247,948

UNITED STATES PATENT OFFICE 2,247,948

JUICE EXTRACTING DEVICE

Herbert C. Johnson, Wilmette, Ill.

Application June 5, 1939, Serial No. 277,351

1 Claim. (Cl. 146—3)

My invention relates to juice extracting devices and it has to do particularly with household juice extracting devices of the so-called reamer type.

The objects of my invention are to provide an improved juice extracting device of the foregoing character which is of simple and inexpensive construction; to provide a juice extracting device which embodies but few operating parts, all of which may be readily and quickly assembled and disassembled; to provide a device which may be easily kept clean and sanitary; and to provide a portable device which is compact and light in weight but which is strong and sturdy and is adapted to serve its intended purpose in a highly efficient manner for a long period of time.

Other objects and advantages will become apparent as this description progresses and by reference to the drawing wherein—

Figure 1 is a side elevational view of one form of structure embodying my invention;

Fig. 2 is a front elevational view of the structure shown in Fig. 1;

Fig. 3 is an enlarged sectional view taken substantially on line 3—3 of Fig. 2;

Fig. 4 is a section taken substantially on line 4—4 of Fig. 3; and

Fig. 5 is a section taken substantially on line 5—5 of Fig. 3.

The structure shown in the drawing includes a base section 10, an upright body section 11 and a reamer section 12. The base section 10, preferably, takes the form of a casting having a circular body portion 10a with three radially directed arms 10b, such arms being so arranged that two are disposed forwardly and one rearwardly, so that the base will remain flat upon a supporting surface in the use of the device. The circular base portion 10a is provided with an annular depression 10c for receiving and confining the bottom of a glass or other receptacle 13 against lateral displacement.

The body section 11, preferably, takes the form of a casting having a flat bottom part 11a secured to the rear base arm 10b by screws 14. The body section 11 is so shaped that it extends upwardly and forwardly from the base 10 so that the reamer section 12 carried by the upper end thereof is disposed substantially above the glass-supporting part 10c of the base. The upper end of the body section is provided with a horizontal portion which takes the form of a part of a dovetail connection including a male or tenon element 11b tapered forwardly.

The reamer section 12 takes the form of a cast unit including an annular cup portion 15, the rear portion of which is provided with a depending, integral supporting boss 16 of generally rectangular shape in cross section. The rear under part of the supporting boss 16 is provided with a dovetail connection including a mortise or cavity shaped complementally to and receiving the dovetail tenon 11b on the upper end of the body section 11. The lateral tenon 11b limits the extent to which the dovetail joint parts may be slid together, and, after assembly, the dovetail joint parts 11b and 12a may be fixed together in any desired manner to fixedly secure the reamer section to the body section. The annular cup portion 15 of the reamer section 12 is provided with a sloping bottom portion 15a which terminates in an open spout 17 which, in the assembled position of the parts above described, is disposed directly above the base part 10a and the receptacle 13 seated thereupon.

The reamer section 12 further includes a conically shaped reamer member 18 having exterior, axially directed ribs 19 thereon. The reamer 18 is supported concentrically and rotatively within the cup portion 15; and, to that end, the forward part 16a of the supporting boss 16 is disposed approximately at the central part of the cup spout 17. From that point, the boss part 16a is extended vertically upward through the spout 17 and the cup portion 15 provides a cylindrical reamer supporting member 21. The lower part of the supporting boss 16 is provided with a horizontal bore 22 and the vertically extending reamer support 21 is provided with a vertical bore 23 disposed at substantially right angles to the bore 22. In these openings I rotatably mount a pair of right-angularly disposed cylindrical gear members 24 and 25, the inward ends of which are provided with bevel gear portions 26 and 27 adapted to mesh with each other as shown in Fig. 3. The gear members 24 and 25 are locked against longitudinal displacement from their gear-engaged positions by suitably provided pins, or the like, 28, 29, engaging, respectively, annular grooves 30 and 31 at the ends of the gear members opposite the gear portions 26 and 27 thereof. The outer end of the gear member 24 is provided with a reduced, threaded extension 32 projecting outwardly through the outer end of the bore 22 where it receives the head 33 of a handle member 34. The other gear member 25 is provided with a reduced and flat-sided end portion 35 projecting outwardly beyond the outer end of the bore 23 where it detachably and non-rotatably supports the reamer 18.

The reamer 18, preferably, takes the form of a body 18a having a hollow lower portion providing a depending skirt-like portion 18b and an inner horizontal seat portion 18c. The body 18a is further provided with an axial, annular opening 36 of substantially the same size as the end portion 35 of the gear member 25, and a pin, or the like, 37 is extended in part through the wall of the opening 36 to cooperate with the flat side 35a of the end portion 35 to cause the reamer 18 to rotate with the gear member 25. The inner horizontal seat portion of the reamer is adapted to seat upon the outer end of the member 21 in position for ready detachment but supported for rotation.

In the use of the structure above described, a lemon, orange, or the like, is first cut into two or more sections and the cut section is then placed upon the reamer 18 with the interior portion thereof in engagement with the reamer ribs. The fruit is held in this position (pressure being applied downwardly thereon) while the handle 34 is rotated. As the handle 34 is rotated, the reamer is rotated by the gear members 24 and 25 and the juice is extracted from the fruit in a manner that will be well understood. The juice so extracted is deposited in the cup portion and it eventually pours through the spout 17 and into the glass 18 therebeneath. The juice is strained before it leaves the cup portion 15. To this end, I provide a strainer 38 having a horizontal perforate part 38a and an upstanding skirt part 38b. The horizontal part is provided with a central upstanding cylindrical sleeve 39 that fits freely over the vertical reamer support 21. The skirt part 38b is connected to the perforate part by a rounded surface shaped complementally to an adjacent lower wall portion of the cup 15 against which it loosely seats. In this way the strainer is supported for ready detachment and in position for straining all juice extracted from the fruit.

Structure of the foregoing character may be manufactured very cheaply. It embodies but few operating parts and they may be detached very easily and quickly for cleaning. This is important from the standpoint of sanitation. Although the structure is quite simple, it is strong and sturdy and fills the need of a very cheap juice extracting device which is of such low cost that it may be purchased and used by persons having the lowest incomes.

I claim:

A juice extracting device comprising a base having a part adapted for supporting a juice receiving receptacle, an upstanding body section mounted on said base, a cup portion mounted on said body section and having a juice discharge spout in its bottom disposed directly above the receptacle supporting part of said base, a conically shaped reamer disposed centrally of said cup portion with its lower part disposed within said cup portion and with its upper part projecting upwardly thereabove, means extending integrally upward above and non-rotatably within said cup portion for rotatably supporting said reamer under its own weight, said supporting means having an axial opening therein, and means for rotating said reamer which includes another and right-angularly disposed opening in said cup portion connecting with said axial opening, a pair of members rotatably disposed in said openings and having meshing gear connections at their inner adjacent ends, the one of said members mounted in said axial opening being long enough to extend upwardly through and beyond the end of said reamer supporting means and having means for non-rotatably connecting it with said reamer, whereby said reamer is not only supported for rotation without lateral displacement but also may be easily and quickly detached from said one member merely by outward movement of the reamer, a handle on the outer end of the other of said members for rotating the latter member to, in turn, rotate both members and the reamer, and means cooperating with said members and the openings in which they are mounted for preventing axial displacement of said members while permitting rotation thereof.

HERBERT C. JOHNSON.